United States Patent
Suzuki (10) Patent No.: US 7,193,967 B2
(45) Date of Patent: *Mar. 20, 2007

(54) SWITCHING SYSTEM

(75) Inventor: Makoto Suzuki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/223,143

(22) Filed: Sep. 12, 2005

(65) Prior Publication Data

US 2006/0050710 A1 Mar. 9, 2006

Related U.S. Application Data

(63) Continuation of application No. 09/939,706, filed on Aug. 28, 2001, now Pat. No. 6,961,308.

(30) Foreign Application Priority Data

Aug. 29, 2000 (JP) .............................. 2000-259061

(51) Int. Cl.
*H04L 12/26* (2006.01)
(52) U.S. Cl. ...................................... 370/232; 370/236
(58) Field of Classification Search ..................... None
See application file for complete search history.

(56) References Cited

U.S. PATENT DOCUMENTS 4,984,264 A 1/1991 Katsube ....................... 379/197

(Continued)

FOREIGN PATENT DOCUMENTS

JP 6-326776 11/1994

(Continued)

OTHER PUBLICATIONS

Hidehiro Arimitsu et al.; "A Call-Setup Method in Data Switching Systems"; NTT Communication Switching Laboratories; vol. 92; No. 91; 92-DPS-58; Nov. 19-20, 1992: pp. 25-32.

(Continued)

*Primary Examiner*—Doris H. To
*Assistant Examiner*—Phuongchau Ba Nguyen
(74) *Attorney, Agent, or Firm*—Harrity Snyder, LLP (57) ABSTRACT

An ATM switching system 1 is provided with an ATM switch 11, a reserved connection memory 12 for storing reserved connection information, a call history memory 13 for maintaining call histories of requests for connection from subscriber's terminal units $2_{-1}$ to $2_{-n}$, and a call-signal processing section 15. The call-signal processing section 15 generates a request for connection with respect to a trunk ATM switching network 3 by the use of the call histories in the call history memory 13 in the case where no call was issued from the subscriber's terminal units, and stores response results thereof in the reserved connection memory 16. Thereafter, when there was a call from the subscriber's terminal units $2_{-1}$ to $2_{-n}$, and contents of the request for connection thereof are the same as the reserved connection information, which has been stored in the reserved connection memory 16, processing for connection is executed by the use of the reserved connection information. As a result, an ATM switching system by which response becomes possible in even the case where a large amount of calls are issued at the same time, besides reduction in cost can also be attained is provided.

9 Claims, 7 Drawing Sheets

U.S. PATENT DOCUMENTS

| | | | |
|---|---|---|---|
| 5,166,675 A * | 11/1992 | Amemiya et al. | 340/3.51 |
| 5,396,485 A | 3/1995 | Ohno et al. | 370/16 |
| 5,680,390 A | 10/1997 | Robrock, II | 370/229 |
| 5,771,231 A * | 6/1998 | Watanabe | 370/377 |
| 5,999,820 A * | 12/1999 | Sutanto et al. | 455/508 |
| 6,016,336 A * | 1/2000 | Hanson | 379/88.23 |
| 6,043,903 A * | 3/2000 | Nakai et al. | 358/437 |
| 6,243,662 B1 * | 6/2001 | Hashimoto | 702/187 |
| 6,512,923 B2 * | 1/2003 | Pallas et al. | 455/435.1 |
| 6,526,274 B1 * | 2/2003 | Fickes et al. | 455/414.1 |
| 6,636,513 B1 * | 10/2003 | Nishikawa et al. | 370/395.1 |
| 6,782,268 B1 * | 8/2004 | Thompson et al. | 455/461 |
| 6,961,308 B2 * | 11/2005 | Suzuki | 370/232 |

FOREIGN PATENT DOCUMENTS

JP     2000-236355     8/2004

OTHER PUBLICATIONS

Hidehiro Arimitsu et al.; "A Study of Subscribed Call-Setup Method"; 1993 Institute of Electronics, Information and Communication Engineers Fall Conference B-501, Aug. 15, 1993; 3 pages.

* cited by examiner

|  | INPUT SIDE | | OUTPUT SIDE | |
|---|---|---|---|---|
|  | TRANSMISSION PATH | (VPI, VCI) | TRANSMISSION PATH | (VPI, VCI) |
| ELEMENT1 | SUBSCRIBER'S TERMINAL UNIT 2-1 | (0, 32) | SWITCHING NETWORK 3 | (0, 32) |
| ELEMENT2 | SUBSCRIBER'S TERMINAL UNIT 2-2 | (0, 32) | SWITCHING NETWORK 3 | (0, 32) |
|  | ⋮ | | | |
| ELEMENTn | SUBSCRIBER'S TERMINAL UNIT 2-n | | | |

CALL HISTORY REGION

- 13-1: CALL HISTORY REGION (ZERO O'CLOCK TO ONE O'CLOCK)
- 13-2: CALL HISTORY REGION (ONE O'CLOCK TO TWO O'CLOCK)
- 13-3: CALL HISTORY REGION (TWO O'CLOCK TO THREE O'CLOCK)
- 13-22: CALL HISTORY REGION (TWENTY-ONE O'CLOCK TO TWENTY-TWO O'CLOCK)
- 13-23: CALL HISTORY REGION (TWENTY-TWO O'CLOCK TO TWENTY-THREE O'CLOCK)
- 13-24: CALL HISTORY REGION (TWENTY-THREE O'CLOCK TO ZERO O'CLOCK)

CALL HISTORY MEMORY 13

FIG. 8

|  | CALL TERMINAL | THE OTHER END SUBSCRIBER'S TERMINAL | ZONE | TRAFFIC TYPE |
|---|---|---|---|---|
| ELEMENT 1 | SUBSCRIBER'S TERMINAL UNIT 2-1 | SUBSCRIBER'S TERMINAL UNIT 4 | 64kbps | CBR |
| ELEMENT 2 | SUBSCRIBER'S TERMINAL UNIT 2-2 | SUBSCRIBER'S TERMINAL UNIT 4 | 128Kbps | VBR |
| ⋮ | ⋮ | ⋮ | ⋮ | ⋮ |
| ELEMENT n |  |  |  |  |

SWITCHING SYSTEM

RELATED APPLICATION

This application is a continuation of U.S. patent application Ser. No. 09/939,706 filed Aug. 28, 2001, now U.S. Pat. No. 6,961,308 the disclosure of which is incorporated herein by reference.

FIELD OF THE INVENTION

The present invention relates to an ATM (Asynchronous Transfer Mode) switching system, and particularly to an ATM switching system that can perform ATM processing without delay in even a case where there are a number of calls at the same time.

BACKGROUND OF THE INVENTION

ATM has such a characteristic that switching processing wherein all of information are divided into a certain unit called by the name of "cell" a packet size of which is a fixed length (consisting of five byte header and forty-eight byte data), and so divided information is transferred asynchronously can be carried out by only a hardware. Accordingly, such switching processing is suitable for treating unitarily multimedia information. For instance, a frequency can be changed in response to contents of data in accordance with such a manner wherein cells are transferred thinly in case of E-mail, while cells are transferred densely in case of voice or moving image. Thus, there is such a characteristic that a large amount of data can be transmitted at a high speed.

A procedure for communication in ATM switching system is specified in detail by ITU-TS (International Telecommunication Union-Telecommunication Standardization Section) being an international standardization institution, ATM forum or the like. Such type of ATM switching system is disclosed in, for example, Japanese Patent Kokai No. 2000-49799. The constitution of such ATM switching system will be described hereinafter by referring to the accompanying drawings wherein FIG. 1 is a block diagram showing a conventional ATM switching system.

Figure 1:
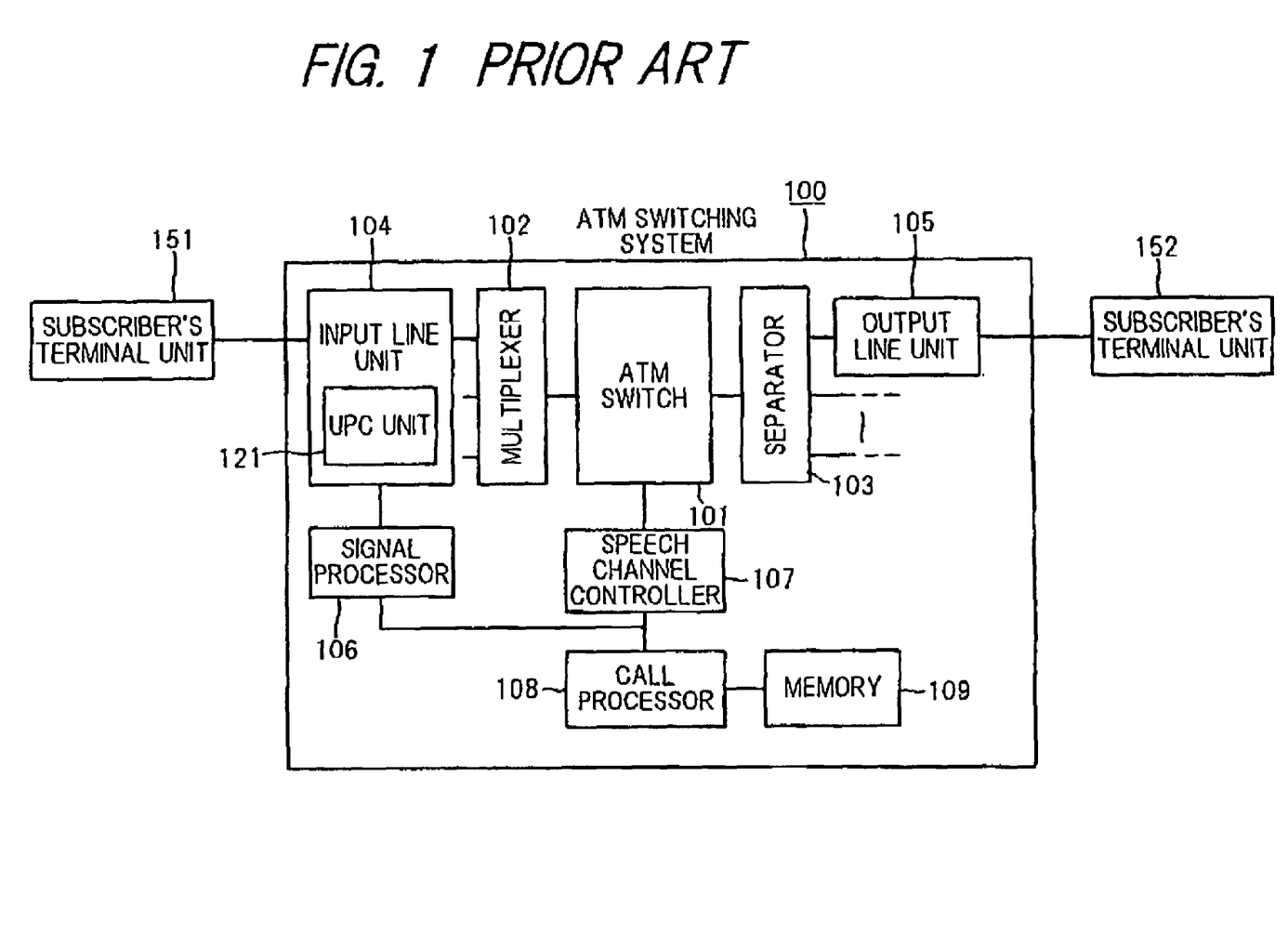
FIG. 1 is block diagram showing a conventional ATM switching system.

In FIG. 1, an ATM switching system 100 is connected with subscriber's terminal units 151 and 152. The ATM switching system 100 comprises an ATM switch 101 for implementing switching processing, a multiplexer 102 connected to an input stage of the ATM switch 101, a separator 103 connected to an output stage of the ATM switch 101, an output line unit connected to an output stage of the separator 103, a signal processor 106 for inputting signals from the subscriber's terminal unit 151 to the multiplexer 102, a speech channel controller 107 connected to the ATM switch 101, a call processor 108 connected to the speech channel controller 107, and a memory 109 connected to the call processor 108.

The signal processor 106 executes analytical processing for control signals such as call signals. The speech channel controller 107 controls establishment and release of an ATM connection based on call admission control (CAC) and call release control by means of the call processor 108. The call processor 108 implements call admission control on the basis of call signal and call release control on the basis of call releasing signal. Furthermore, when congestion appears on a certain line, the call processor 108 interrupts call admission with respect to the line. Namely, when a line becomes an over traffic state with respect to a transmission speed requested by return information (traffic information, bearer information and the like) relating to quality in a call signal (setup message), an establishment for ATM connection is rejected with respect to a call in question. Moreover, the memory 109 retains a variety of data such as call processing data, and subscribers' data.

Then, a case where data is transmitted from the subscriber's terminal unit 151 to the subscriber's terminal unit 152 will be described herein. In this case, the ATM switch 101 routes cells delivered from the subscriber's terminal unit 151 to the subscriber's terminal unit 152 by means of hardware switching to output the above-described cells to a transmission path connected to the subscriber's terminal unit 152. In order to realize such operation of the ATM switch 101 as described above, it is required to report information as to a counterpart to be communicated, quality in communication, a communicating zone and the like with respect to the ATM switching system and an ATM switching network. In this case, transmission for the report by an operator is a call.

Call processing in the ATM switching system 100 will be described. When a call signal is delivered from the subscriber's terminal unit 151, the call signal is input to the signal processor 106 through the input line unit 104. Then, such analytical processing whether or not the call signal has been composed in accordance with correct procedure and contents is made by the signal processor 106. Thereafter, the call processor 108 processes adequancies of a variety of reported information contained in the call signal, and if a communication service based on the reported information is permissible, the call processor makes required setting, so that a communication path is established via a route of the input line unit 104→the multiplexer 102→the ATM switch 101→the separator 103→the output line unit 105.

According to the conventional ATM switching system, however, the signal processor 106 and the call processor 108 are treated as a kind of components in the ATM switching system, a throughput capacity of them is suppressed to a certain level in view of hardware cost and average processing load, so that even if these processors are increased in the form of a plurality of pairs, there is a limitation as to the throughput capacity. For this reason, there are required simultaneous processing for a large amount of calls and signals, when all the terminal units connected to an ATM switching system issue calls at the same time, or when a tentative failure in a trunk transmission line is restored. Thus, a processing speed becomes insufficient in the signal processor 106 and the call processor 108, so that there arises a case where the system cannot respond to a request by a certain calling subscriber even if there is a free speech channel in the ATM switch 101.

Moreover, there is such a high possibility that a calling subscriber calls again after lapse of a certain period of time in the case where the ATM switching system did not respond to a call made by the calling subscriber. Such situation makes processing loads of the signal processor 106 and the call processor 108 worse. A countermeasure for such situation is to mount such signal and call processors 106 and 108 each having a sufficient processing speed. In an ATM switching system to which a large number of subscriber's terminal units have been connected, however, when it is intended to assure a desired processing speed even in case where all the subscriber's terminal units were called, an increase in cost due to an increase in a hardware scale cannot be avoided.

SUMMARY OF THE INVENTION

Accordingly, an object of the present invention is to provide an ATM switching system which can respond even if a number of calls are issued at the same time, besides a cost of which can be reduced.

In order to achieve the above-described object, an ATM (Asynchronous Transfer Mode) switching system for connecting a plurality of subscriber's terminal units with a switching network by the use of an ATM switch operated in ATM, comprises a call history memory for maintaining call histories of requests for connection from the plurality of subscriber's terminal units; a reserved connection memory for writing and reading reserved connection information; and a call-signal processing section provided with a first means for generating a request for connection with respect to the switching network by the use of the call histories in the call history memory in the case where no call was issued from the plurality of subscriber's terminal units during a predetermined period of time, and storing contents of a response from the switching network with respect to the request for connection in the reserved connection memory as updated reserved connection information, and a second means for using the updated reserved connection information which has been stored in the reserved connection memory to control the ATM switch in the case where there was a call from any of the subscriber's terminal units after applying the first means and the request for connection is the same as the reserved connection information which has been updated and stored in the reserved connection memory.

According to the above-described constitution, the call-signal processing section makes a request for connection with respect to a switching network by the use of a previous call history which has been stored in the call history memory in the case where no call has been issued from the respective subscriber's terminal units for a predetermined period of time, and a response result from the switching network with respect to the request for connection is maintained in the reserved connection memory as reserved connection information. Thereafter, when there was a call from any of the subscriber's terminal units, contents of the request for connection due to the call are compared with the response result, which has been maintained in the reserved connection memory, and if both the contents coincide with each other, processing for connection is carried out by the use of the response result, which has been maintained in the reserved connection memory (updated reserved connection information). As described above, a preparation for the following call has been completed in the case where there was no call from subscriber's terminal units for a predetermined period of time in an ATM switching system of the present invention. Namely, the processing for a call is not started after a request for connection was received, so that a concentration of load in call processing with respect to the request for connection can be reduced in a processing ATM switching system at that time in the case where a call being the same as a past (previous) call was issued. Furthermore, a response time with respect to the same call can be reduced, so that a start of communication between subscriber's terminal units can be made faster.

BRIEF DESCRIPTION OF THE DRAWINGS

The present invention will be explained in more detail in conjunction with appended drawings, wherein.

DESCRIPTION OF THE PREFERRED EMBODIMENTS

Preferred embodiments of the present invention will be described hereinafter in conjunction with the accompanying drawings.

Figure 2:
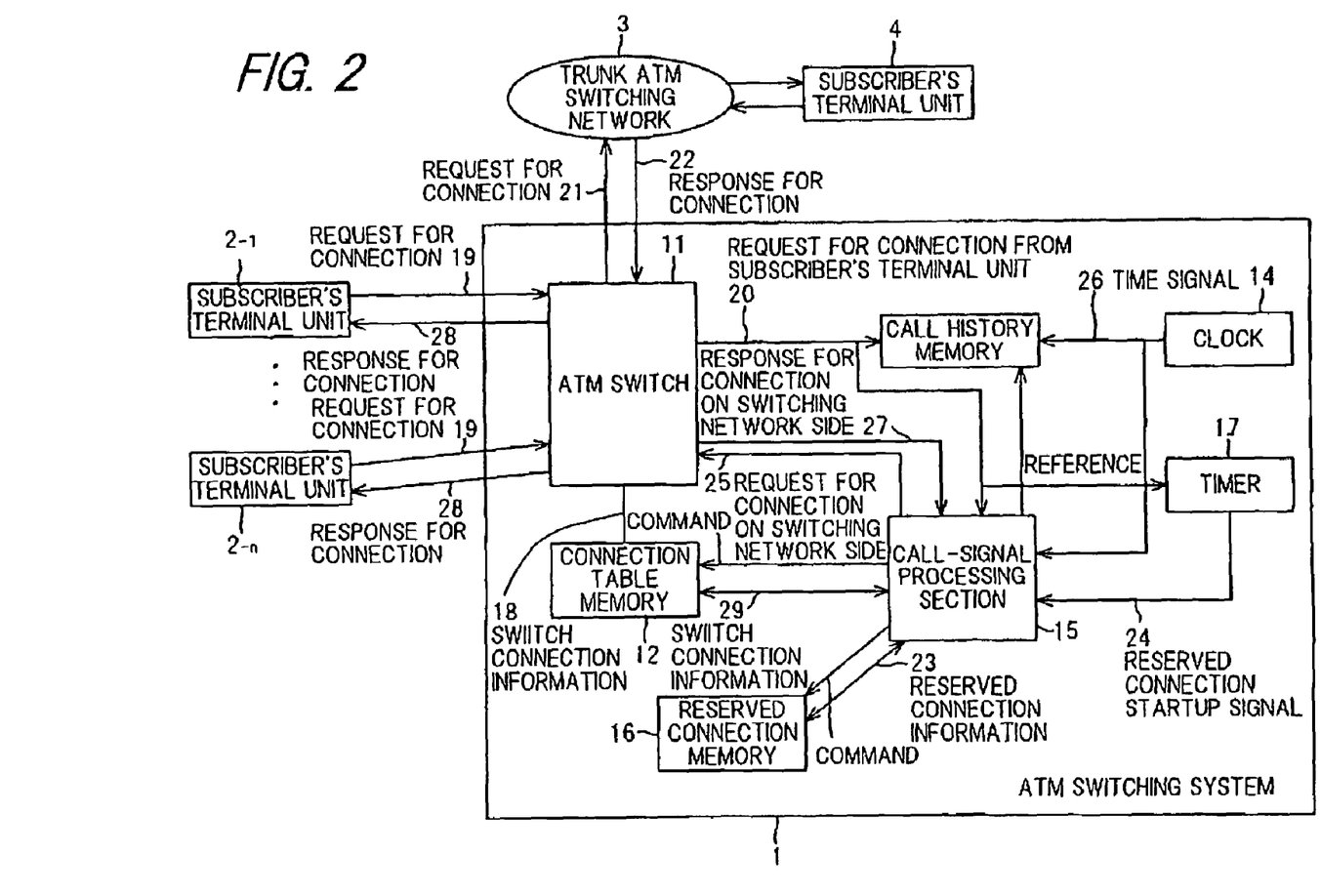
FIG. 2 is a block diagram showing an ATM switching system according to the present invention.

FIG. 2 is a block diagram showing an ATM switching system according to the present invention wherein subscriber's terminal units $2_{-1}$ to $2_{-n}$ and a trunk ATM switching network 3 are connected to the ATM switching system 1, and a subscriber's terminal unit 4 has been connected to the trunk ATM switching network 3. The ATM switching system 1 is constituted with centering around an ATM switch 11, and a connection table memory 12 and a call history memory 13 are connected to the ATM switch 11. A call-signal processing section 15 is connected to the ATM switch 11, the connection table memory 12, and the call history memory 13, respectively. A clock 14 is connected to the call history memory 13, and a reserved connection memory 16 is connected to the call-signal processing section 15. Furthermore, a timer 17 is connected to the ATM switch 11 and the call-signal processor 15, respectively. The ATM switching system 1 contains directly the subscriber's terminal units $2_{-1}$ to $2_{-n}$, and it functions to demultiplex ATM cells transmitted and received by these subscriber's terminal units to connect them to the trunk ATM switching network 3.

The ATM switch 11 implements switching of ATM cells transmitted between the subscriber's terminal units $2_{-1}$ to $2_{-n}$ and the trunk ATM switching network 3 in accordance with switch connection information 18 written in the connection table memory 12. Moreover, the ATM switch 11 outputs requests for connection to be made between the subscriber's terminal units $2_{-1}$ to $2_{-n}$ and the trunk ATM switching network 3 as well as responses thereof to the call-signal processing section.15, and further it outputs requests for connection 19 from the subscribers terminal units $2_{-1}$ to $2_{-n}$ to the call history memory 13 and the timer 17 as they are as requests for connection 20 from subscriber's terminal.

The connection table memory 12 stores switch connection information to be given to the ATM switch 11. The call history memory 13 stores contents of the requests for connection 20 from the ATM switch 11 in each time. The clock 14 generates time signals 26 to be applied to the call history memory 13 and the call-signal processing section 15.

The call-signal processing section 15 refers to the call history memory 13 in accordance with a reserved connection startup signal 24 from the timer 17, and outputs a request for connection 25 on the side of the switching network having the same contents as that of the call history memory 13 to the ATM switch 11. When the call-signal processing section 15 receives the request for connection 20 from subscriber's terminal units $2_{-1}$ to $2_{-n}$, the contents thereof are compared with that of the reserved connection information 23 contained in the reserved connection memory 16, and as a result, if there is a corresponding element, the reserved connection information 23 is taken out from the reserved connection memory 16, and the reserved connection information 23 thus taken out is retained in the connection table memory 12.

Furthermore, when the call-signal processing section 15 receives a request for response 22 from the trunk ATM switching network 3 concerning the request for connection 21 delivered to the trunk ATM switching network 3, a VPI (Virtual Pass Identifier)/VCI (Virtual Channel Identifier) value that has not been used yet in a transmission path in which a subscriber's terminal unit having a call history resides is selected, the VPI/VCI value is made to be a set with a VPI/VCI value in a response for connection 27 on the side of a switching network received, and the set of values is retained in the connection table memory 12 as switch connection information. The ATM switch 11 is controlled by the switch connection information thus obtained. Since the switch connection information is a result obtained by making a request for connection in advance with respect to the side of the trunk ATM switching network 3 to discriminate a theoretical communication path, there is no need to take freshly a confirmation upon the side of the trunk ATM switching network with respect to a request for connection from the subscriber's terminal units $2_{-1}$ to $2_{-n}$ in the future.

The reserved connection memory 16 executes storage and readout of reserved connection information 23 in accordance With instructions from the call-signal processing section 15. The timer 17 supervises the presence or absence of reception of the requests for connection 20 from the subscriber's terminal units $2_{-1}$ to $2_{-n}$, and when no request for connection 20 arrives within a certain period of time, a reserved connection startup signal 24 is output to the call-signal processing section 15.

In accordance with the constitution as described above, when the call-signal processing section 15 produces a request for connection 25 based on the connection request information retained in the call history memory 13 during a period of time wherein there is no request for connection 19 from the subscriber's terminal units $2_{-1}$ to $2_{-n}$, processing of the request for connection 19 is started previously, so that a result of the processing is retained in the reserved connection memory 16 as reserved connection information 23. Thereafter, when the request for connection 19 having the same contents as that of a call history from the subscriber's terminal units $2_{-1}$ to $2_{-n}$, the reserved connection information 23 that has been stored in the reserved connection memory 16 is utilized as it is. Accordingly, there is no need for starting freshly the other processing. Thus, processing load that has produced at the time when the request for connection 19 was received from the subscriber's terminal units $2_{-1}$ to $2_{-n}$ can be reduced.

Figure 3:
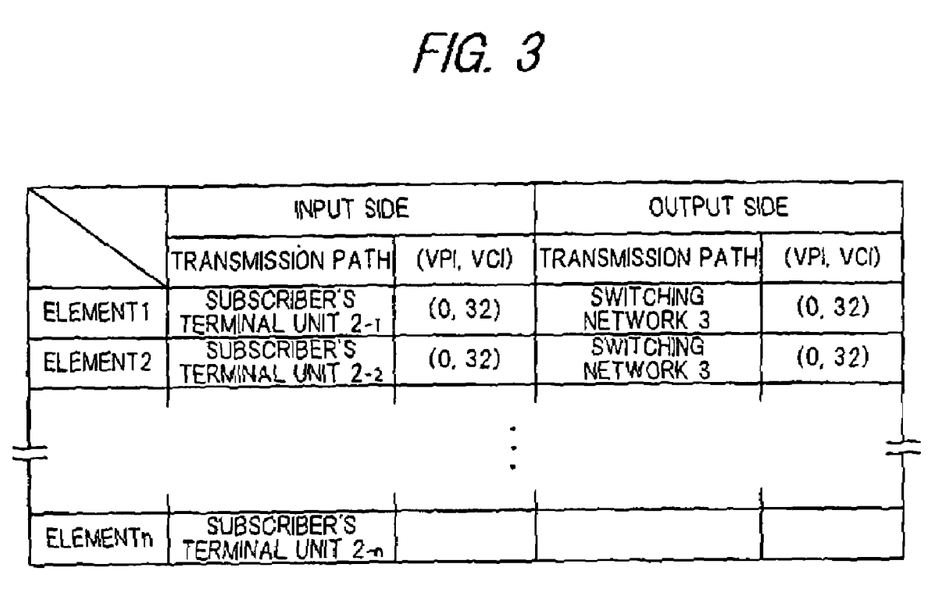
FIG. 3 is an explanatory diagram showing a data-retaining format for a storing table in the connection table memory of FIG. 2.

FIG. 3 is a constitutional diagram showing a storage table in the connection table memory 12 wherein elements 1 and 2 have been set out with respect to transmission paths and VPI/VCI values on input and output sides viewed from the ATM switch 11 in which a subscriber's terminal unit to be connected has been assigned to the transmission path on the input side, while a trunk ATM switching network 3 has been assigned to the transmission path on the output side. Furthermore, VPI/VCI values have been set out in each element.

Figure 4:
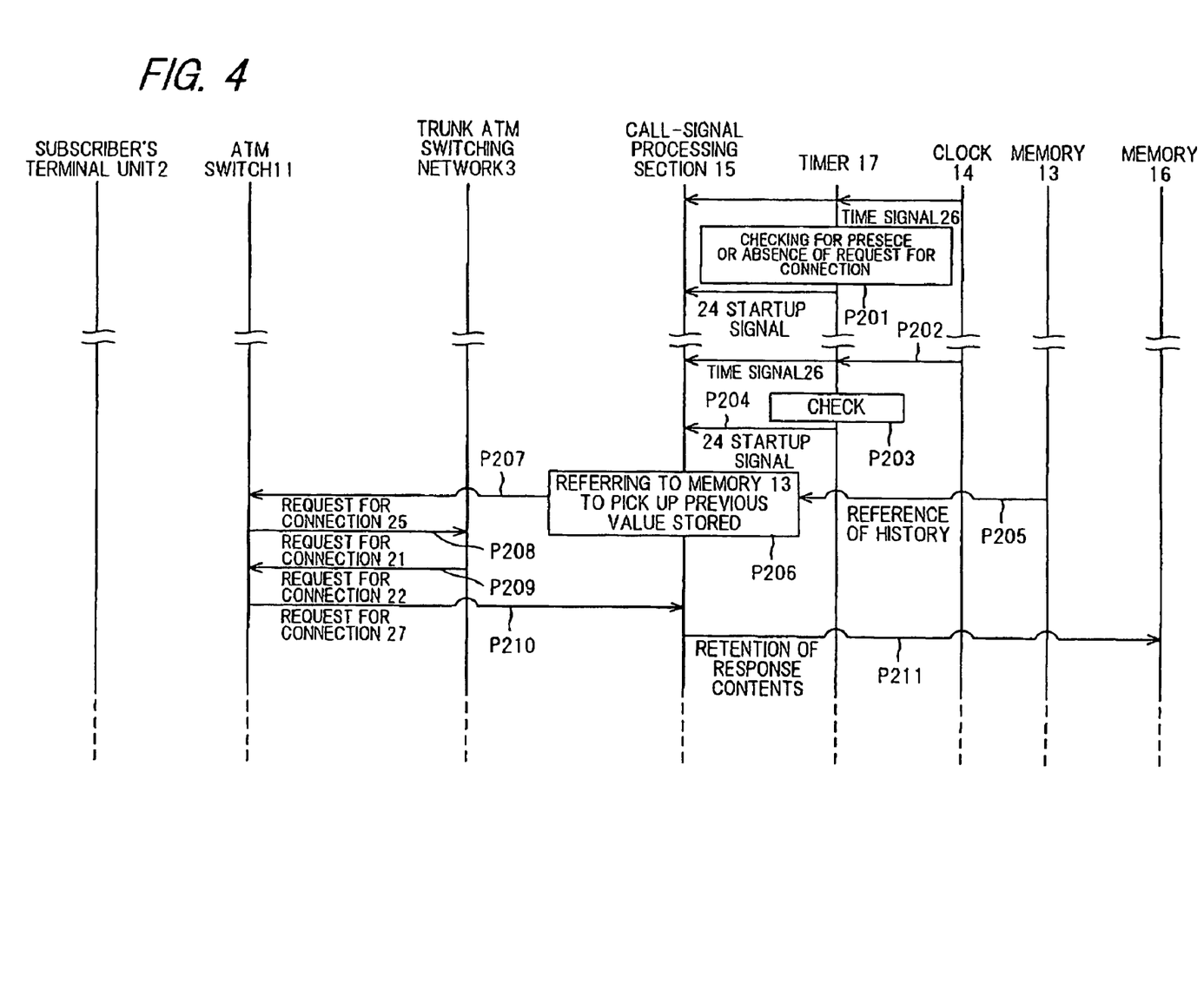
FIG. 4 is a timing chart showing processing timings in the case where there is no request for connection from subscriber's terminal units on calling subscriber side for a certain period of time.
Figure 5:
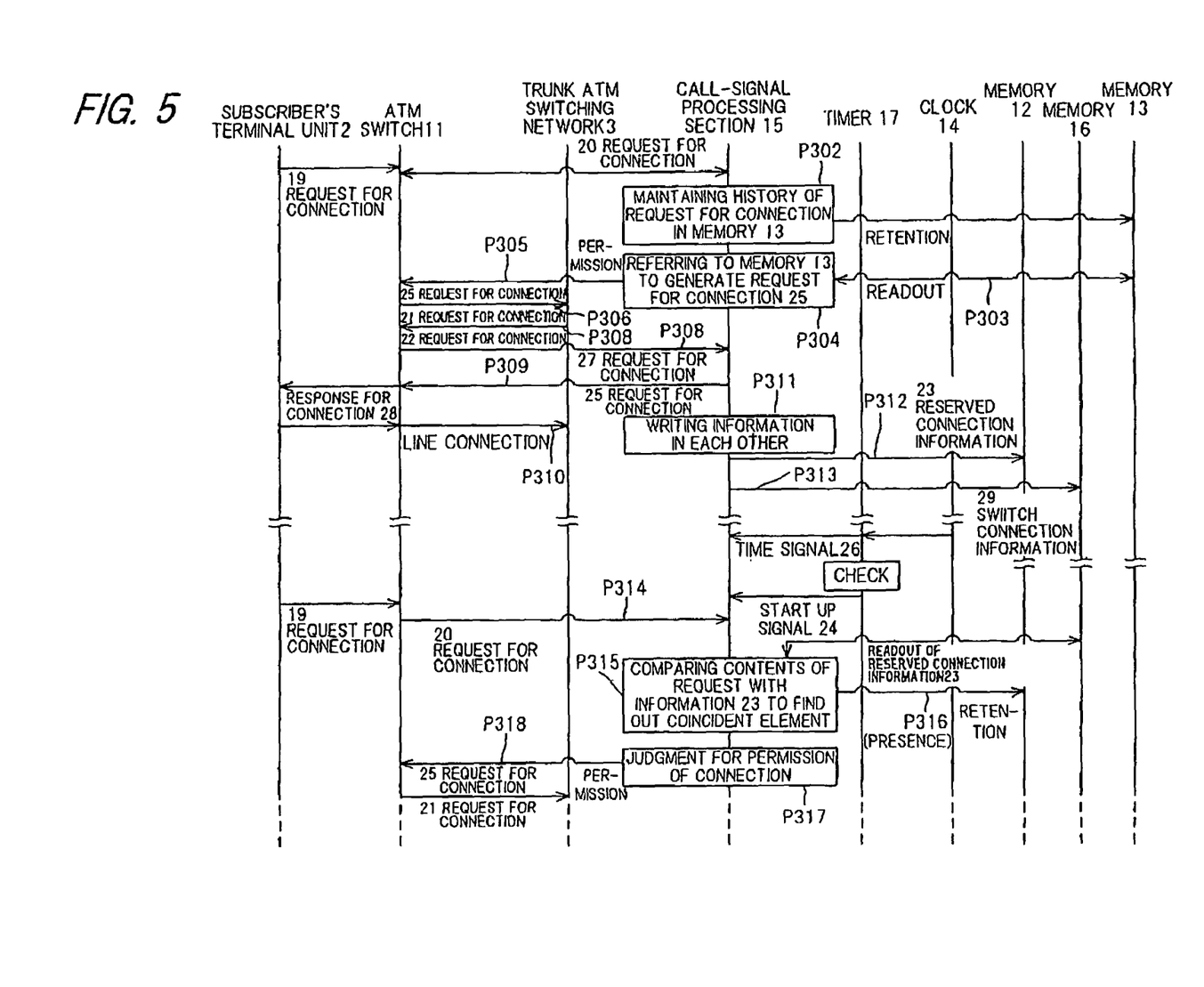
FIG. 5 is a timing chart showing processing timings in the case where there was a request for connection from subscriber's terminal units on calling subscriber side.

FIGS. 4 and 5 are diagrams each illustrating processing timings in an ATM switching system according to the present invention. An explanation for the processing will be mentioned later. In both the figures, a character "P" means processing.

Figure 6:
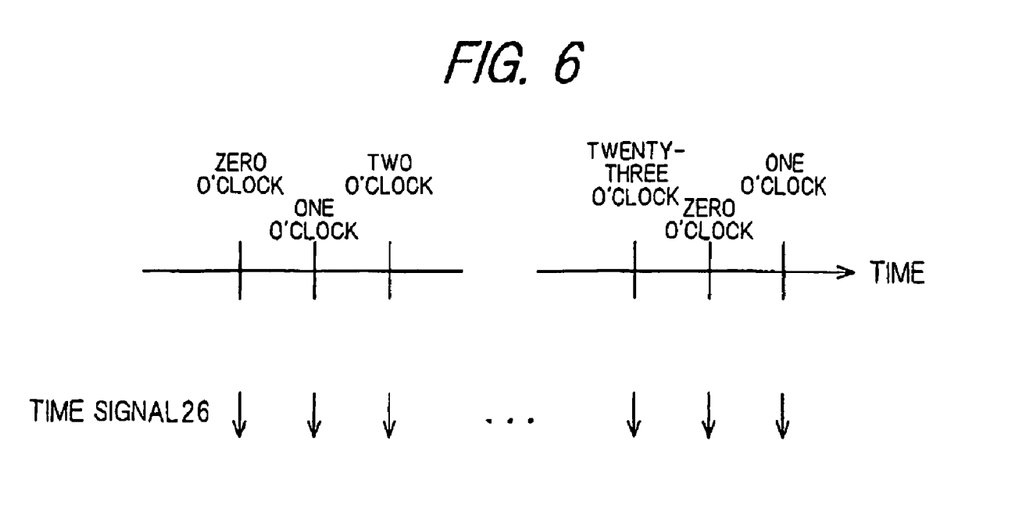
FIG. 6 is an explanatory diagram showing examples of generation of time signals in the clock of FIG. 2.

FIG. 6 shows examples of generation of time signals 26 of the clock 14.

The clock 14 outputs periodically a time signal 26 indicating a present time in accordance with operation of the built-in clock to the call history memory 13. In this case, time signals 26 are output once every hour so as to be 0:00, 1:00, 2:00, . . . wherein signals indicating times (zero o'clock, one o'clock, two o'clock etc.) are output at the output timings as shown in FIG. 6 as time signals 26. A memory region of the call history memory 13 to which these time signals are to be input (hereinafter referred to as "call history region") is divided in such that data can be independently maintained in every periods extending from a precedent time signal 26 to the following time signal 26, and data at which time is to be maintained in a certain call history region has been previously determined, respectively.

Figure 7:
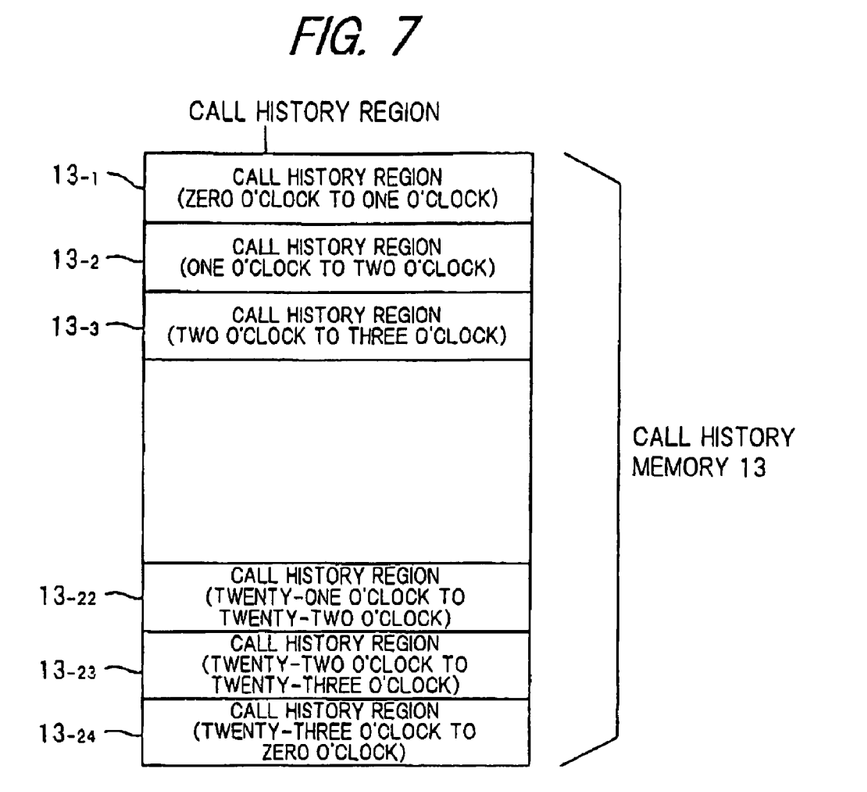
FIG. 7 is a constitutional diagram showing a constitution of a call history region in the call history memory of FIG. 2.

FIG. 7 is a constitutional diagram showing a constitution of call history regions of the call history memory 13.

In the call history memory 13, the whole of memory region is divided equally into twenty-four sections to define call history regions $13_{-1}$ to $13_{-24}$, in order to assure regions in once every hour with respect to time signals 26 each having one hour interval output by the clock 14. The call history memory 13 writes contents of a request for connection 20 in a subscriber's terminal unit from the ATM switch 11 in each of twenty-four call history regions $13_{-1}$ to $13_{-24}$.

Figure 8:
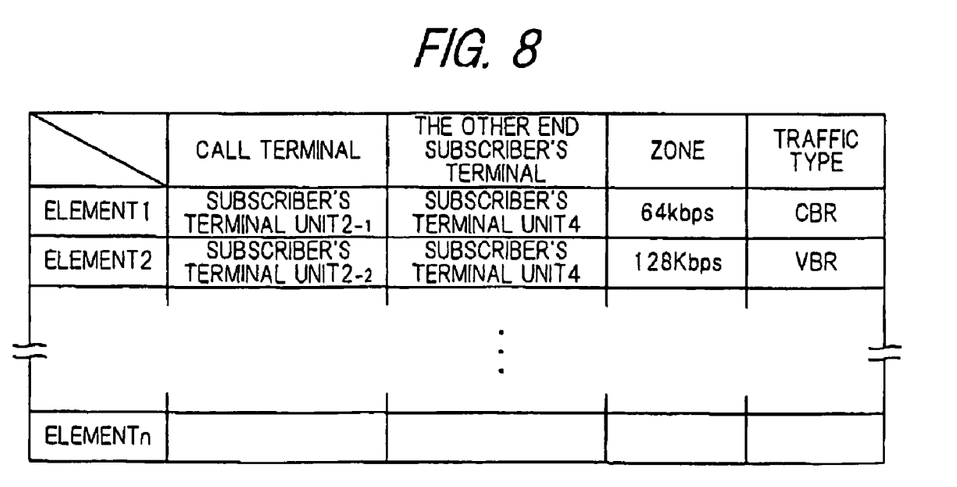
FIG. 8 is an explanatory diagram showing a data-retaining format of the call history memory of FIG. 2.

FIG. 8 is a diagram showing a data-retaining format of the call history memory 13.

In each of the twenty-four call history regions $13_{-1}$ to $13_{-24}$, contents of the number of the maximum n, i.e., from element 1 to element n are stored with respect to the contents of request for connection composed of call terminal units (the subscriber's terminal units $2_{-1}$ to $2_{-n}$ in the present example), the other end terminal (the subscriber's terminal unit 4 in the present example), a zone, and a traffic type. The example shown in FIG. 8 represents a situation wherein a call history where the time signal 26 extends from "zero o'clock" to "one o'clock" is maintained.

For instance, it is assumed that two requests for connection of CBR (Constant Bit Rate) traffic in an applied zone of 64 kbps derived from the subscriber's terminal unit $2_{-1}$ to the subscriber's terminal unit 4 and of VBR (Variable Bit Rate) traffic in an applied zone of 128 kbps derived from the subscriber's terminal unit $2_{-2}$ to the subscriber's terminal unit 4 are received during a period from after outputting a time signal 26 indicating "zero o'clock" to outputting a time signal 26 indicating "one o'clock". In this case, as shown in FIG. 8, a call terminal, the other end terminal, a zone, and a traffic type are stored in each element as a call history.

As described above, the call history memory 13 maintains successively contents of request for connection 20 from the subscriber's terminal units $2_{-1}$ to $2_{-n}$ transferred from the ATM switch 11 in other addresses in the same region before receiving the following time signal 26 from the clock 14, and when the following time signal 26 was received from the clock 14, the call history memory 13 maintains contents of the request for connection 20 from the ATM switch 11 in a call history region assigned to the following time zone. Accordingly, the call history memory 13 may be considered to maintain all the contents of requests for connection 19 received before the latest twenty-four hours.

In the following, operations of the ATM switching system 1 will be described by referring to FIGS. 2 through 8 wherein the subscriber's terminal units $2_{-1}$ to $2_{-n}$ communicate with the subscriber's terminal unit 4 through the ATM switching system 1 and the trunk ATM switching network 3.

The request for connection 19 (20) from the subscriber's terminal units $2_{-1}$ to $2_{-n}$ is always supervised by the timer 17 (P201 in FIG. 4), and when no request for connection 19 (20) is received during a certain continual period of time, the processing shown in FIG. 4 is executed. More specifically, when a time signal 26 is delivered from the clock 14, the timer 17 starts up (P202), and it is checked whether or not the request for connection 20 was received (P203). In the case where any request for connection 20 has not yet been received, the timer 17 delivers the reserved connection startup signal 24 to the call-signal processing section 15 (P204). The call-signal processing section 15 refers to the call history memory 13 (FIGS. 6 and 7 as well as P205) to read out the call history before twenty-three hours (P206), and the result read is delivered to the ATM switch 11 as a request for connection 25 (P207). The ATM switch 11 transfers the request for connection 25 to the trunk ATM switching network 3 as a request for connection 21 without any modification (P208). Upon transfer of the request for connection 21, the trunk ATM switching network 3 returns a response for connection 22 to the ATM switch 11. The ATM switch 11 delivers the response for connection 22 to the call-signal processing section 15 as a response for connection 27 on switching network side (P210). Contents (VPI/VCI value and the like) of the response for connection 22 are stored in the reserved connection memory 16 (P211).

On the other hand, when a request for connection 20 was received from the ATM switch 11 during supervision by the timer 17, output of the reserved connection startup signal 24 is stopped with respect to the call-signal processing section 15, and a series of processing shown in FIG. 5 is executed.

In the case when it is intended to call out the subscriber's terminal unit 4 from the subscriber's terminal units $2_{-1}$ to $2_{-n}$, the subscriber's terminal units $2_{-1}$ to $2_{-n}$ deliver a request for connection 19 to the ATM switch 11 (P301). A format for the request for connection 19 relates to information of "calling subscriber (any user of the subscriber's terminal units $2_{-1}$ to $2_{-n}$), the other end subscriber", "applied transmission zone". "traffic type" and the like as has been standardized by ITU-T, ATM forum or the like, in other words., it represents a band and quality of communication that is intended to perform by a calling subscriber. Furthermore, it is usual to employ VPI/VCI values, which have been previously determined for transmission and reception of such request for connection and response for connection as described above in order to distinguish them from the other data cells. For example, values of VPI=0, and VCI=5 are employed. ATM cells from the subscriber's terminal units $2_{-1}$ to $2_{-n}$ derived from the VPI/VCI values are transferred to the call-signal processing section 15 without any modification. The request for connection 20 is delivered to the call history memory 13 to maintain therein in the format of retention shown in FIG. 7 as a call history (P302).

After the reserved connection startup signal 24 was received from the timer 17 by the call-signal processing section 15, the following operations are started. Contents of the request for connection 20 residing in a call history region of the following time zone of the present time among call history regions of the call history memory 13 are first referred to (P303). Then, contents of request such as a call subscriber, the other end subscriber, an applied transmission zone, and a traffic type, which are written in the request for connection 20, are compared with the present situation of line in use, and it is judged whether or not connection may be permitted (P304)

For instance, when the call-signal processing section 15 receives a reserved connection startup signal 24 at the time 00:30 from the timer 17, the "one to two o'clock" call history region (the second line memory region in FIG. 7) in the call history memory 13 is referred. On one hand, when the call-signal processing section 15 receives the reserved connection startup signal 24 at the time 01:30 from the timer 17, the "two to three o'clock" call history region (the third line memory region in FIG. 7) is referred to. In this case, it is to be noted that the history contents referred by the call-signal processing section 15 corresponds always to that of requests for connection 20 received from the subscriber's terminal units $2_{-1}$ to $2_{-n}$ in the time zone before twenty-three hours with respect to the present time. In the case when "permission" for connection was judged in P304, a request for switching network connection 25 (=request for connection 21) for transferring to the trunk ATM switching network 3 is output as a kind of a forecasted value or an expected value (P305). The contents of the request for switching network connection 25 are the same as that of the connection request signal 19, which have been received previously from the subscriber's terminal units $2_{-1}$ to $2_{-n}$.

The call-signal processing section 15 prepares a connection requesting signal based on the contents of the forefront element (element 1 in FIG. 8), which has been maintained in the call history memory 13 and referred to, to output the same to the ATM switch 11 as a request for connection 25 on switching network side, and the request thus output is further output to the trunk ATM switching network 3 as a request for connection 21 (P306). The trunk ATM switching network 3 calculates a route satisfying a request zone-quality indicated by a request for connection, and a response for connection 22 including a VPI/VCI value to be used for communication between the subscriber's terminal units $2_{-1}$ to $2_{-n}$ and the subscriber's terminal unit 4 is returned to the ATM switch 11 (P307). The call-signal processing section 15 receives the response for connection 22 form the trunk ATM switching network 3 through the ATM switch 11 as a response for connection 27 on switching network side (P308). Then, the call-signal processing section 15 selects a VPI/VCI value that has not yet been employed in a transmission path to which a subscriber's terminal unit shown in the element column of the call-history memory 13 referred to for preparing a request for connection 25 has been connected, and delivers a response for connection 28 including the VPI/VCI value thus selected to the subscriber's terminal units $2_{-1}$ to $2_{-n}$ from which a request for connection 19 has been delivered through the ATM switch 11 (P309). Furthermore, a pair of the VPI/VCI value selected and a VPI/VCI value indicated in the response for connection 22 from the trunk ATM switching network 3 is written in the reserved connection memory 16 (P313). A data format for writing data in the reserved connection memory 16 is the same as that of the connection table memory 12 shown in FIG. 3. The written information is used in case of processing the following request for connection.

If a reserved connection startup signal 24 from the timer 17 is continued at that time, the call-signal processing section 1S executes the same processing as that described above with respect to the following element residing in a corresponding region of the call history memory 13 ("element 2" in FIG. 8). In the case where the reserved connection startup signal 24 from the timer 17 has been released, processing with respect to the following element is not executed. Thereafter, when a request for connection 20 was received from the ATM switch 11 (P314), contents of the request for connection 20 are compared with that of each element of the reserved connection memory 16 to obtain a prepared value (P315). As a result of the comparison, when there is a coincident element, the element is taken out from the reserved connection memory 16, the contents thereof are maintained in the connection table memory 12 as it is (P316). On the other hand, when there is no coincident element, it is judged whether or not a request for connection can be permitted (P317), and then, a request for connection 25 is prepared to output it to a switching network side (P318). In the call-signal processing section 15, since the processing P315 can be realized by only retrieval, fresh processing of no use is not required in the case where there is an element contents of which coincide with that of a request for connection 20 (19) received in comparison with the case where there is no coincident element. Hence, a processing load of the call-signal processing section 15 decreases, besides a response to a subscriber's terminal unit becomes faster.

The ATM switch 11 executes a line connection between the subscriber's terminal units $2_{-1}$ to $2_{-n}$ and the trunk ATM switching network 3 based on a response for connection 28 (a response for connection 27 on switching network side) from the call-signal processing section 15 (P310). At the same time, the call-signal processing section 15 makes a pair of a VPI/VCI value contained in a connection response signal received from the trunk ATM switching network 3 and a previous VPI/VCI value selected in a transmission path to which a subscriber's terminal unit belonging to a calling subscriber from which the response for connection 19 was delivered has been connected, and the resulting pair is stored in the connection table memory 12 as switch connecting information as shown in FIG. 3 (P312).

As described above, according to the preferred embodiment of the present invention, when a request for connection 19 from the subscribers terminal units $2_{-1}$ to $2_{-n}$ has not yet been received for a certain period of time, contents of a request for connection 20 which have been stored in the call history memory 13 and have been received before twenty-three hours form the present time are output to the trunk ATM switching network 3 as a request for connection 21 without any modification, and a VPI/VCI value shown in a response for connection 22 is stored in the reserved connection memory 16. Thereafter, when a request for connection 19 having the same contents as that have been stored in the reserved connection memory 16 are received from the subscriber's terminal units $2_{-1}$ to $2_{-n}$, there is no need for implementing freshly processing of a request for connection 21 upon a side of the trunk ATM switching network 3 as well as of the response for connection 22, processing for con-firming requested contents or the like, but contents of the reserved connection memory 16 may simply be again maintained in the connection table memory 12, because contents of the processing result have been already maintained in the reserved connection memory 16.

As described above, according to an ATM switching system of the present invention, a time during which no request for connection is issued from the subscriber's terminal units $2_{-1}$ to $2_{-n}$ is utilized, and call processing is finished by a call history stored in the call history memory 13, whereby a processing load in the case where a request for connection 19 was actually issued from the subscriber's terminal units $2_{-1}$ to $2_{-n}$ is reduced. Particularly, an advantage of reduction in load appears remarkably in the case where a number of similar calls are issued in the same time zone as that of the previous day.

In the above-described embodiment, it is to be noted that each of descriptions as to the connection memory table 12, the call history memory 13, a data format of the reserved connection memory 16, a cycle and an outputting method of time signals output from the clock 14, and a method for dividing a maintaining region concerning the call history memory 13 relates to only an example, and accordingly, the present invention is not limited to these manners and methods as described above.

As described above, an ATM switching system according to the present invention is provided with a call history memory, a connection table memory, a reserved connection memory, and a call-signal processing section wherein a request for connection is made with respect to a switching network by the use of a previous call history which has been maintained in the call history memory in the call-signal processing section in the case where no call has been issued from each of subscriber's terminal units during a predetermined period of time, a response result from the switching network with respect to the request for connection is maintained in the reserved connection memory as reserved connection information, and thereafter, when there was a call from a subscriber's terminal unit, contents of the request for connection due to the call are compared with the response result maintained in the reserved connection memory, and it is adapted to implement processing for connection by the use of the response result maintained in the reserved connection memory in the case where both the contents are the same with each other. Thus, a period of time during which no call is issued from a subscriber's terminal unit for a predetermined time is utilized for completing a preparation of the following call in the ATM switching system of the present invention, so that a concentration of load for call processing in the ATM switching system can be reduced in the case when the same call as that of the past (previous time) was issued. Besides, a response time for the same call decreases, whereby starting of a communication between subscriber's terminal units can be increased.

It will be appreciated by those of ordinary skill in the art that the present invention can be embodied in other specific forms without departing from the spirit or essential characteristics thereof.

The presently disclosed embodiment is therefore considered in all respects to be illustrative and not restrictive. The scope of the invention is indicated by the appended claims rather than the foregoing description, and all changes that come within, the meaning and range of equivalents thereof are intended to be embraced therein.

What is claimed is:

1. A method, comprising:
   sending a first request for connection to a switching network when no calls have issued from multiple subscriber terminal units during a specified period of time;
   receiving a response from the switching network;
   storing contents of the response from the switching network in a reserved connection memory as reserved connection information;
   receiving a second request for connection from a subscriber terminal unit of the multiple subscriber terminal units; and
   using the reserved connection information to switch a call from the subscriber terminal unit to the switching network based on the second request matching the reserved connection information.

2. The method of claim 1, wherein the second request for connection includes a band and quality of communication intended to be used by the subscriber terminal unit.

3. The method of claim 1, further comprising:
maintaining a call history of requests for connection from the multiple subscriber terminal units.

4. The method of claim 3, wherein the first request for connection is sent based on the call history.

5. The method of claim 1, wherein the response from the switching network includes at least one of a virtual path identifier (VPI) or a virtual channel identifier (VCI) value associated with a connection via the switching network.

6. A method, comprising:
storing information related to requests for connection received from a plurality of subscriber terminal units over a predetermined period of time;
sending a request for connection to a switching network, using the stored information, when no calls have issued from the plurality of subscriber terminal units over a specified time period;
storing contents of a response to the request from the switching network as reserved connection information; and
using the reserved connection information to switch a call to the switching network based on receipt of a request for connection from one of the plurality of subscriber terminal units.

7. The method of claim 6, wherein the contents of the response include at least one of a virtual path identifier (VPI) or a virtual channel identifier (VCI) associated with a connection to the switching network.

8. A system, comprising:
a call history memory configured to store information related to requests for connection received from a plurality of subscriber terminal units over a predetermined period of time;
a call processing section configured to send a request for connection to a switching network, using the stored information, when no calls have issued from the plurality of subscriber terminal units over a specified time period; and
a reserved connection memory configured to store contents of a response to the request from the switching network as reserved connection information,
wherein the call processing section is further configured to use the reserved connection information to switch a call to the switching network based on receipt of a request for connection from one of the plurality of subscriber terminal units.

9. A system, comprising:
means for sending a first request for connection to a switching network when no calls have issued from multiple subscriber terminal units during a specified period of time;
means for receiving a response from the switching network;
means for storing contents of the response from the switching network in a reserved connection memory as reserved connection information;
means for receiving a second request for connection from a subscriber terminal unit of the multiple subscriber terminal units; and
means for using the reserved connection information to switch a call from the subscriber terminal unit to the switching network based on the second request matching the reserved connection information.

* * * * *